United States Patent
Lin et al.

(10) Patent No.: US 6,707,984 B2
(45) Date of Patent: Mar. 16, 2004

(54) CHANGING A PLAYBACK SPEED FOR VIDEO PRESENTATION RECORDED IN A MODIFIED FILM FORMAT

(75) Inventors: Shu Lin, Indianapolis, IN (US); Jianlei James Xie, Carmel, IN (US); Mark Alan Schultz, Carmel, IN (US)

(73) Assignee: Thomson Licensing S.A., Boulogne (FR)

( * ) Notice: Subject to any disclaimer, the term of this patent is extended or adjusted under 35 U.S.C. 154(b) by 98 days.

(21) Appl. No.: 10/001,466

(22) Filed: Oct. 31, 2001

(65) Prior Publication Data

US 2003/0081940 A1 May 1, 2003

(51) Int. Cl.[7] .................................................. H04N 5/91
(52) U.S. Cl. ......................... 386/68; 386/125; 386/131
(58) Field of Search ........................... 386/68, 70, 131, 386/81, 125–126, 109, 110, 111

(56) References Cited

U.S. PATENT DOCUMENTS 5,485,280 A * 1/1996 Fujinami et al. ............ 386/131
5,589,993 A * 12/1996 Naimpally .................... 386/81
5,867,625 A * 2/1999 McLaren ...................... 386/68
6,064,796 A * 5/2000 Nakamura et al. .......... 386/131

* cited by examiner

*Primary Examiner*—Vincent Boccio
(74) *Attorney, Agent, or Firm*—Joseph S. Tripoli; Harvey D. Fried; Christine Johnson (57) ABSTRACT

The invention includes a system and method 300 for changing a playback speed of a selected video segment having repeat fields. To achieve fast motion play a selected video segment can be modified to delete repeat fields 340. Further pictures can be deleted as required 360 to achieve a desired playback speed. To achieve slow motion play, a selected video segment can be modified by encoding repeat fields into conventional field pictures. Further pictures can be added as required to achieve a desired playback speed 330. Further, a repeat first field flag in the picture header of the picture containing the repeat field can be set to zero 325. Furthermore, a GOP structure of the modified video segment can be reencoded into a conventional 365 or a desired 367 GOP structure. Additionally, the modified video segment can be recorded exclusively on a desired portion of a storage medium 370.

27 Claims, 7 Drawing Sheets

GOP₁:   B₀T B₀B B₀T B₁B B₁T I₂B I₂T I₂B B₃T B₃B B₄T B₄B B₄T P₅B P₅T B₆B B₆T B₆B B₇T B₇B P₈T P₈B P₈T B₉B B₉T B₁₀B B₁₀TB B₁₀B P₁₁T P₁₁B

FIG. 3B

GOP₁:   B₀T B₀B B₁T B₁B I₂T I₂B B₃T B₃B B₄T B₄B P₅T P₅B B₆T B₆B B₇T B₇B P₈T P₈B B₉T B₉B B₁₀T B₁₀B P₁₁T P₁₁B

FIG. 3C

GOP₁:   B₀ B₁ I₂ B₃ B₄ P₅ B₆ B₇ P₈ B₉ B₁₀ P₁₁

FIG. 3D

GOP₁:   B₀ B₁ I₂ B₃ B₄ P₅ B₆ B₇ I₈ B₉ B₁₀ P₁₁

FIG. 3E

GOP₁:   B₀ B_d B₁ B_{d1} I₂ P_{d2} B₃ B_{d3} B₄ B_{d4} P₅ P_{d5} B₆ B_{d6} B₇
GOP₂:   B_{d7} I₈ P_{d8} B₉ B_{d9} B₁₀ B_{d10} P₁₁ P_{d11}

FIG. 3F

GOP₁:   B₀ B_d I₁ B_{d1} B₂ P_{d2} B₃ B_{d3} P₄ B_{d4} B₅ P_{d5} B₆ B_{d6} P₇
GOP₂:   B_{d7} B₈ I_{d8} B₉ B_{d9} P₁₀ B_{d10} B₁₁ P_{d11}

FIG. 3G

GOP₁:  B₀T B₀B B₀T B₁B B₁T I₂B I₂T I₂B B₃T B₃B B₄T B₄B B₄T P₅B P₅T B₆B B₆T B₆B B₇T B₇B P₈T P₈B P₈T B₉B B₉T B₁₀B B₁₀TB B₁₀B P₁₁T P₁₁B

GOP₂:  B₁₂T B₁₂B B₁₂T B₁₃B B₁₃T I₁₄B I₁₄T I₁₄B B₁₅T B₁₅B B₁₆T B₁₆B B₁₆T P₁₇B P₁₇T B₁₈B B₁₈T B₁₈B B₁₉T B₁₉B P₂₀T P₂₀B P₂₀T B₂₁B B₂₁T B₂₂B B₂₂T B₂₂B P₂₃T P₂₃B

FIG. 3H

GOP₁:  B₀T B₀B B₁T B₁B I₂T I₂B B₃T B₃B B₄T B₄B P₅T P₅B B₆T B₆B B₇T B₇B P₈T P₈B B₉T B₉B B₁₀T B₁₀TB P₁₁T P₁₁B

GOP₂:  B₁₂T B₁₂B B₁₃T B₁₃B I₁₄T I₁₄B B₁₅T B₁₅B B₁₆T B₁₆B P₁₇T P₁₇B B₁₈T B₁₈B B₁₉T B₁₉B P₂₀T P₂₀B B₂₁T B₂₁B B₂₂T B₂₂TB P₂₃T P₂₃B

FIG. 3I

GOP₁:  B₀ B₁ I₂ B₃ B₄ P₅ B₆ B₇ P₈ B₉ B₁₀ P₁₁

GOP₂:  B₁₂ B₁₃ I₁₄ B₁₅ B₁₆ P₁₇ B₁₈ B₁₉ P₂₀ B₂₁ B₂₂ P₂₃

FIG. 3J

GOP₁:  B₀ I₂ B₃ P₅ B₆ P₈ B₉ P₁₁

GOP₂:  B₁₂ I₁₄ B₁₅ P₁₇ P₂₀ B₂₂ P₂₃

FIG. 3K

GOP₁₊₂:  B₀ I₂ B₃ P₅ B₆ P₈ B₉ P₁₁ B₁₂ I₁₄ B₁₅ P₁₇ P₂₀ B₂₂ P₂₃

FIG. 3L

GOP₁₊₂:  B₀ B₂ I₃ B₅ B₆ P₈ B₉ B₁₁ P₁₂ B₁₄ B₁₅ P₁₇ B₂₀ B₂₂ P₂₃

GOP: $B_{0T}$ $B_{0B}$ $B_{0T}$ $B_{1B}$ $B_{1T}$ $I_{2B}$ $I_{2T}$ $I_{2B}$ $B_{3T}$ $B_{3B}$ $B_{4T}$ $B_{4B}$ $B_{4T}$ $P_{5B}$ $P_{5T}$ $B_{6B}$ $B_{6T}$ $B_{6B}$ $B_{7T}$ $B_{7B}$ $P_{8T}$ $P_{8B}$ $P_{8T}$ $B_{9B}$ $B_{9T}$ $B_{10B}$ $B_{10TB}$ $B_{10B}$ $P_{11T}$ $P_{11B}$

FIG. 4B

GOP: $B_{0T}$ $B_{0B}$ $B_{1T}$ $B_{1B}$ $I_{2T}$ $I_{2B}$ $B_{3T}$ $B_{3B}$ $B_{4T}$ $B_{4B}$ $P_{5T}$ $P_{5B}$ $B_{6T}$ $B_{6B}$ $B_{7T}$ $B_{7B}$ $P_{8T}$ $P_{8B}$ $B_{9T}$ $B_{9B}$ $B_{10T}$ $B_{10TB}$ $P_{11T}$ $P_{11B}$

FIG. 4C

GOP: $B_{0T}$ $B_{0B}$ $B_{d}$ $B_{1B}$ $B_{1T}$ $I_{2B}$ $I_{2T}$ $I_{2d}$ $B_{3T}$ $B_{3B}$ $B_{4T}$ $B_{4B}$ $B_{4d}$ $P_{5B}$ $P_{5T}$ $B_{6B}$ $B_{6T}$ $B_{6d}$ $B_{7T}$ $B_{7B}$ $P_{8T}$ $P_{8B}$ $P_{8d}$ $B_{9B}$ $B_{9T}$ $B_{10B}$ $B_{10TB}$ $B_{10d}$ $P_{11T}$ $P_{11B}$

FIG. 4D

GOP: $B_{0T}$ $B_{0B}$ $B_{1T}$ $B_{1B}$ $I_{2T}$ $I_{2B}$ $B_{3T}$ $B_{3B}$ $B_{4T}$ $B_{4B}$ $P_{5T}$ $P_{5B}$ $B_{6T}$ $B_{6B}$ $B_{7T}$ $B_{7B}$ $P_{8T}$ $P_{8B}$ $B_{9T}$ $B_{9B}$ $B_{10T}$ $B_{10B}$ $P_{11T}$ $P_{11B}$ $B_{12T}$ $B_{12B}$ $B_{13T}$ $B_{13B}$ $P_{14T}$ $P_{14B}$

FIG. 4E

GOP: $B_0$ $B_1$ $I_2$ $B_3$ $B_4$ $P_5$ $B_6$ $B_7$ $P_8$ $B_9$ $B_{10}$ $P_{11}$ $B_{12}$ $B_{13}$ $P_{14}$

FIG. 4F

CHANGING A PLAYBACK SPEED FOR VIDEO PRESENTATION RECORDED IN A MODIFIED FILM FORMAT

BACKGROUND OF THE INVENTION

1. Technical Field

The inventive arrangements relate generally to methods and apparatus providing advanced operating features for programs recorded on disc media, for example recordable digital video discs, hard disk drives and optical discs.

2. Description of the Related Art

While conventional trick modes enable a user to view recorded video at different speeds, the video is not permanently altered by the process. If the video is displayed at a later time, then the user must initiate another trick mode to view the video at a different speed. Significantly, however, many users may wish to permanently change the playback speed of a particular portion of video to achieve special visual effects by modifying the video once the video has been recorded onto the media. Such a process can permit speed variations during playback. Unfortunately, several significant obstacles exist that make editing recorded video in such a fashion impracticable.

For example in the case of media such as magnetic tape and optical disc media such as DVD, it is desirable to record program data in a contiguous manner on the medium so as to avoid interruptions in program presentation. Typically, however, the space occupied by the original recorded video is not large enough to store the pictures that must be repeated in order to produce certain trick effects such as slow motion playback. This makes it difficult to store a modified video segment in the same physical location as the original data. In addition to spatial limitations, repeating pictures on the disc or other media can interfere with the conventional picture structure of the video, which can degrade the display quality of the video during playback.

Performing trick modes on video recorded under a film structure format, particularly when a moving object is recorded, can present another problem as well. Video recorded under a film structure format is recorded at twenty-four (24) frames per second. However, video displayed on televisions is typically displayed at a rate of about thirty (30) frames per second or, equivalently, at an NTSC rate of sixty (60) fields per second when interlaced scanning is used. Based on the incompatibility of the display rates between film and television, DVD players or recorders can convert video recorded under a film structure to an NTSC format using a process known as 3:2 pulldown.

Using 3:2 pulldown, a DVD player or recorder will rearrange each frame into a top field and a bottom field. For example, an initial frame from a group of four (4) is shown as three (3) fields, where the top field is shown first, then the bottom field is shown second, then the top field is shown again. The next film frame is shown as two (2) fields, with the bottom field being shown first and the top field being shown second. The third film frame of the group is again shown as three (3) fields, but in this frame the bottom field is shown first, followed by the top field, and the bottom field is shown again. Lastly, the fourth frame is shown as two fields, with the top field shown first and the bottom field shown last. Since 3:2 pulldown adds repeat fields to a video during playback and modifying recorded video to produce slow motion playback adds additional repeat pictures, inconsistent object movement is likely to result if the pictures repeated for slow motion playback contain repeat fields.

Thus, a need exists for a method of changing a playback speed for video recorded in a modified film format having repeat fields and further overcoming the detriments described above.

SUMMARY OF THE INVENTION

In a first aspect of the invention, a method for changing the playback speed of a selected video segment having repeat fields includes the step of modifying the selected video segment by removing repeat fields to achieve fast motion play. This can be accomplished by setting a repeat first field flag located in a picture header to zero to prevent 3:2 pulldown from being performed on a video segment. Pictures from the selected video segment can also be removed to achieve a desired playback speed.

In a second aspect of the invention, the method can also include the step of encoding the repeat fields into conventional field pictures. An associated repeat first field flag located in a picture header can then be set to zero. Dummy pictures can be added to the selected video segment to achieve a desired playback speed.

Yet another aspect of the present invention for modifying a selected video segment having repeat fields includes the steps of replacing the repeat fields with dummy pictures and setting a repeat first field flag located in a picture header to zero. Further dummy pictures can be added to the selected video segment to achieve a desired playback speed. In the above discussed methods, the selected video segment can be reencoded into a conventional or other desired GOP structure after modifying the selected video segment.

Another aspect of the present invention comprises a system for changing the playback speed of a selected video segment having repeat fields. The system can include storage medium reading circuitry for selectively reading a video segment which has been recorded on a portion of a rewritable storage medium, a video processor for modifying the selected video segment for a changed playback speed, and video recorder circuitry for recording the modified video segment exclusively on a portion of the storage medium. The video processor can modify the selected video segment by removing the repeat fields to achieve fast motion play. The video processor can also modify the selected video segment by encoding the repeat fields into conventional field pictures and/or setting a repeat first field flag located in a video header to zero after modifying a selected video segment.

The video processor may also delete a plurality of non-video packs in the selected video segment to reduce an amount of data contained in the modified video segment. Furthermore, the video processor can reduce the resolution of at least one frame contained in the modified video segment and/or lower the bit rate of the modified video segment during a recording step. In a video segment, the video processor can add or delete at least one dummy picture to change the playback speed.

In the above system, a selected video segment can be reencoded into a desired GOP structure after being modified and the modified segment can be recorded exclusively on a desired portion of a storage medium.

DETAILED DESCRIPTION OF THE PREFERRED EMBODIMENTS

Recordable DVD Device

Figure 1:
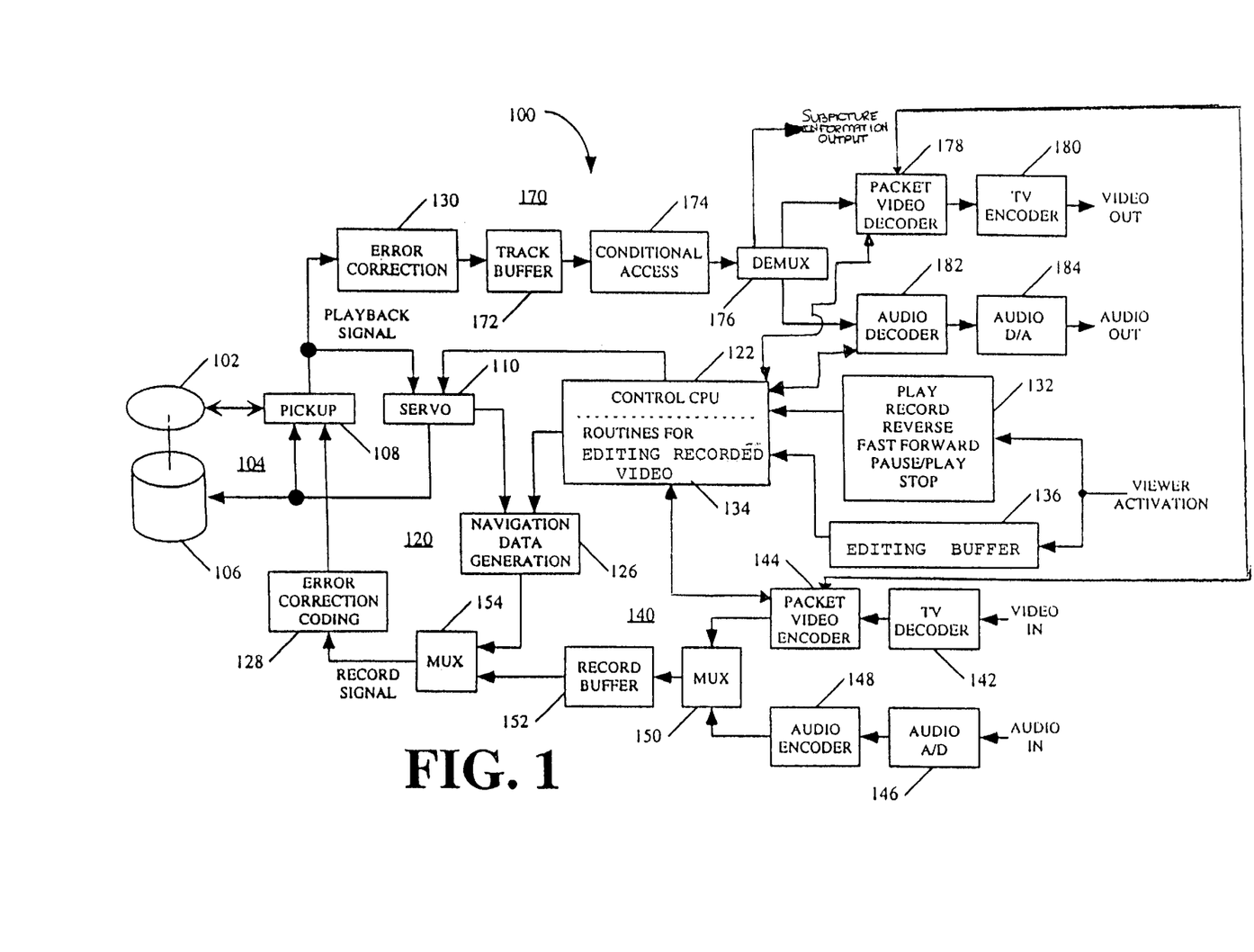
FIG. 1 is a block diagram of a rewritable DVD device that can change the playback speed of video recorded in a modified format in accordance with the inventive arrangements herein.

A device 100 for implementing the various advanced operating features in accordance with the inventive arrangements is shown in block diagram form in FIG. 1. A rewritable disc medium is embodied as a rewritable DVD in the illustrated embodiment. In many instances, as will be noted, the rewritable disc medium can also be, for example, a hard drive or a magneto optical disc (MOD). An example of a MOD is a mini-disc. Moreover, the invention can also be used in a digital tape machine. In fact, the invention is not limited to any particular storage medium device, as it can be used in any other suitable storage medium device.

The device 100 is capable of writing onto and reading from a storage medium, in this example, a rewritable DVD 102. Although the following discussion primarily concerns rewritable DVD, the invention is not so limited, as any other suitable storage medium can be used. The device can include a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 can include a motor 106 for spinning the disc 102 and a pickup assembly 108 that can be adapted to be moved over the disc 102 as the disc 102 spins. A laser on the pickup assembly 108 can burn spots onto a spiral track on the disc 102 and can illuminate spots already burned onto the track for recording and playing back video and/or audio program material. For purposes of understanding the invention, it is irrelevant whether the disc 102 is recordable on one or two sides, or in the event of a double-sided recording, whether the double-sided recording, or subsequent reading from the disc 102, takes place from the same side of the disc 102 or from both sides. The pickup assembly 108 and the motor 106 can be controlled by a servo 110. The servo 110 can also receive the Playback Signal of data read from the spiral track of the disc 102 as a first input. The Playback Signal is also an input to an error correction circuit 130, which can be considered part of the control section or part of the video/audio output processing path 170.

The control section 120 can include a control central processing unit (CPU) 122 and a navigation data generation circuit 126. The control CPU 122 can supply a first input signal to the navigation data generation circuit 126, and the servo 110 can supply a second input signal to the navigation data generation circuit 126. The servo 110 can also be considered part of the control section 120. The navigation data generation circuit 126 can supply a first input signal to the multiplexer (MUX) 154, which can form part of the video/audio input processing path 140.

The output of the MUX 154 can be an input to an error correction coding circuit 128. The output of the error correction coding circuit 128 can be a recordable input signal supplied to the pickup 108, which can be "burned" onto the spiral track of the disc 102 by the laser.

In addition, control and data interfaces can also be provided for permitting the CPU 122 to control the operation of the video encoder 144, video decoder 178 and audio decoder 182 Suitable software or firmware can be provided in memory for the conventional operations performed by control CPU 122. Further, program routines for the editing recorded video features 134 are provided for controlling CPU 122 in accordance with the inventive arrangements.

A control buffer 132 for viewer activatable functions can indicate those functions presently available, namely play, record, reverse, fast forward, slow play, jump, pause/play and stop. In addition, an editing buffer 136 can be provided to receive commands for implementing the recorded video editing features.

The output processing path 170 can include an error correction block 130, a track buffer 172, a conditional access circuit 174 and a demultiplexer 176. The track buffer 172 can read and temporarily store for further processing data read from the disc 102. This data can be processed by the conditional access circuit 174, which can control propagation of the data through the demultiplexer 176 and into respective paths for video and audio processing. Additionally, the output processing path 170 can include a packet video encoder 178, a TV encoder 180, an audio decoder 182 and an audio D/A 184.

The video/audio input processing path 140 can be a signal processing circuit for converting a conventional television signal into digitized packet data for digital recording by the device 100. The input path 140 can include a TV decoder 142 and the packet video encoder 144. The TV decoder 142 can perform 3:2 pulldown on video that is recorded in film structure format and can also identify repeat fields in video that is received with 3:2 pulldown already implemented.

In addition, the input processing path 140 can include an audio A/D 146 and an audio encoder 148. During normal operation, the digitized signals can be combined in a multiplexer 150 and can then be stored in the record buffer 152 until an entire packet has been constructed. As groups of audio and video data packets are created, they can be combined in multiplexer 154 with appropriate navigation packets generated in the navigation generation block 126. The packets can then be sent to the error correction coding circuit 128. Error correction coding circuit 128 can also be deemed to be part of the input path 140.

If a user wishes to edit a portion of video stored on the disc 102, the editing buffer 136 can signal the control CPU 122. In one arrangement, the control CPU 122 can signal the packet video encoder 178 to decode the pictures contained in the video being read from a particular location on the disc 102 and then to send the video containing the decoded pictures to a packet video encoder 144. As will be explained later, in an alternative arrangement, only a selected number of these pictures need to be decoded during the editing process. In either arrangement, any audio associated with the pictures can be forwarded to the audio decoder 182. The control CPU 122 can then instruct the audio decoder 182 to store the audio temporarily. For purposes of creating extra space, however, the audio is generally not recombined with the video during the editing process. Rather, the audio is typically discarded when the storage buffer in the audio decoder 182 overflows. In addition to removing the audio component, any subpicture information associated with the modified video can be separated and prevented from reintegrating with the modified video.

Once the video signal containing the decoded pictures is received at the packet video encoder 144, the video encoder 144 can modify the video signal by adding or deleting pictures. As will be explained in detail below, adding pictures to the video signal can create slow-motion video and deleting pictures from the video can produce fast-forward video. If necessary, the video encoder 144 can then reencode these pictures so that the modified video can be placed on the disc 102.

After the pictures in the edited video signal have been reencoded, the video signal can merely propagate through the multiplexer 150 since audio is typically not combined with the modified video signal. The edited video is then processed in a fashion similar to that of normal video. That is, the modified video signal is combined with navigation data in the multiplexer 154 and error corrected by error correction coding circuit 128. As will be explained later, the edited video signal can then be recorded back onto the disc 102 in its original location on the media.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is contemplated to be within the scope of the invention as recited in the claims.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which includes all the features enabling the implementation of the methods described herein, and which when loaded in a computer system is able to carry out these methods. A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

DVD Data Structure

Figure 2:
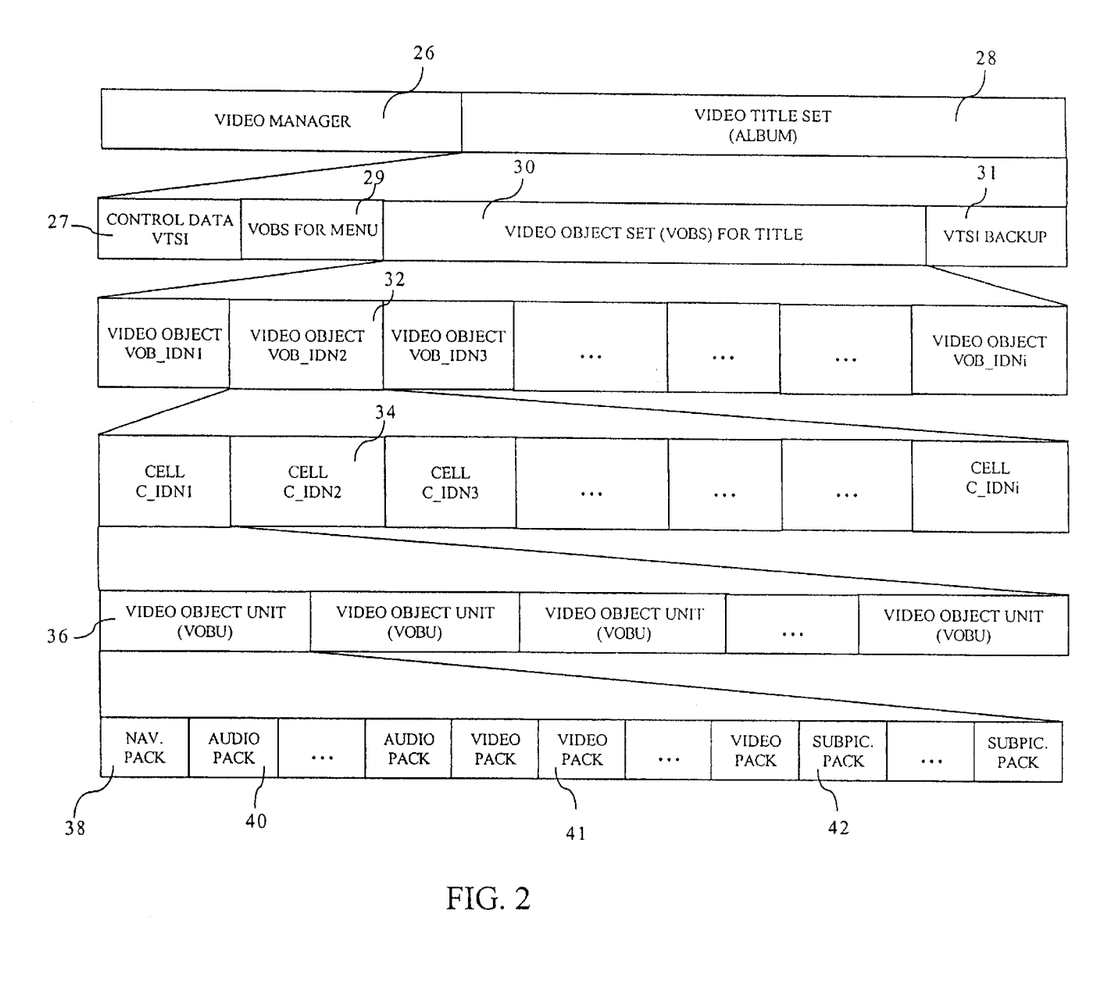
FIG. 2 illustrates a data structure of a rewritable DVD disc.

FIG. 2 illustrates a typical DVD arrangement. However, variations in the structure shown are possible, and the invention is not intended to be limited to the particular embodiment shown. As shown in FIG. 2, each DVD contains a video manager 26 and a video title set (VTS) 28. The VTS includes video title set information (VTSI) 27, an optional video object set for menu 29, one or more VOBS for title 30 which contains the actual title content and a VTSI backup 31. Each VOBS 30 is included of a plurality of video objects (VOB) 32. Each video object 32 includes a plurality of cells 34. Each VOBS 30 also includes a collection of pointers to one or more cells. In this way, the VOBS 30 data links the cells 34 together and indicates in what order the programs or cells 34 are to be played. The cells 34 within a particular VOBS 30 can be flagged for play in any desired order. For example, they can be played sequentially or randomly.

Each cell 34 includes a plurality of video object units (VOBU) 36. Each of the VOBU's 36 in which the video content of the disc resides typically contains 0.4 to 1.0 seconds of presentation material. Each VOBU starts with exactly one navigation pack (NV_PCK) 38 and can include one or more audio packs (A_PCK) 40, one or more video packs (V_PCK) 41 and one or more subpicture packs (SP_PCK) 42. In addition, each VOBU 36 is nominally included of one group of pictures (GOP).

Changing Playback Speed for Video Presentation Recorded in Film Structure Format Modified With 3:2 Pulldown In accordance with the inventive arrangements, a user may alter the playback speed of film video that has already been recorded onto a storage medium. If the user desires to edit the recorded video to produce slow motion video, then one or more pictures may be inserted into the video to create such an effect. The altered video can then be recorded onto the storage medium in the same space previously occupied by the original video. If the user desires to create fast-forward video, then one or more pictures may be removed from the recorded video. Similar to the slow motion editing process, the video can be recorded in the original video's medium space. In either process, the edited video may be reencoded to produce higher quality playback and trick mode operation.

The following is a conventional GOP structure in an MPEG video stream containing film pictures in display order, which can be helpful in explaining the inventive arrangements:

$B_0\ B_1\ I_2\ B_3\ B_4\ P_5\ B_6\ B_7\ P_8\ B_9\ B_{10}\ P_{11}$

Experience has shown that placing two bidirectional predictive (B) frames between each intra (I) or predictive (P) frame works well. Accordingly, the conventional GOP structure as shown is commonly used. Those skilled in the art will appreciate that other GOP structures are also commonly used and may be considered conventional.

The pictures shown in the above conventional GOP structure are film frames and are in bold print to indicate their status as film frames. During the 3:2 pulldown conversion to convert the video to a standard NTSC structure the film frames are first separated into two field pictures, a top field and a bottom field. The following is an example of a conventional GOP structure containing field pictures:

$B_{0T} B_{0B} B_{1T} B_{1B} I_{2T} I_{2B} B_{3T} B_{3B} B_{4T} B_{4B} P_{5T} P_{5B} B_{6T} B_{6B}$
$B_{7T} B_{7B} P_{8T} P_{8B} B_{9T} B_{9B} B_{10T} B_{10B} P_{11T} P_{11B}$

As shown, pictures with the subscript "T" represent the top field pictures, and pictures with the subscript "B" represent the bottom field pictures.

Next, repeat fields are added to convert the video from a twenty-four (24) frame per second display rate to a sixty (60) fields per second display rate. In order to achieve the correct number of repeat fields, the first field displayed in every other frame is repeated. Repeat first field flags in the picture headers identify which frames have a repeat field. The following is a display sequence with repeat field pictures, where I, P, and B indicate the original picture coding type from which the display field is reconstructed:

$B_{0T} B_{0B} B_{0T} B_{1B} B_{1T} I_{2B} I_{2T} I_{2B} B_{3T} B_{3B} B_{4T} B_{4B} B_{4T} P_{5B}$
$P_{5T} B_{6B} B_{6T} B_{6B} B_{7T} B_{7B} P_{8T} P_{8B} P_{8T} B_{9B} B_{9T} B_{10B}$
$B_{10TB} B_{10B} P_{11T} P_{11B}$

These display fields are reconstructed from a GOP that is selected for purposes of illustrating the inventive arrangements are merely examples of GOP structures that car be used to practice the invention, as the invention is not limited to any particular type of GOP structure. In fact, the invention can be applicable to those MPEG encoders that are designed to encode only P frames and I frames or those encoders that are limited to encoding only I frames.

Figure 3A:
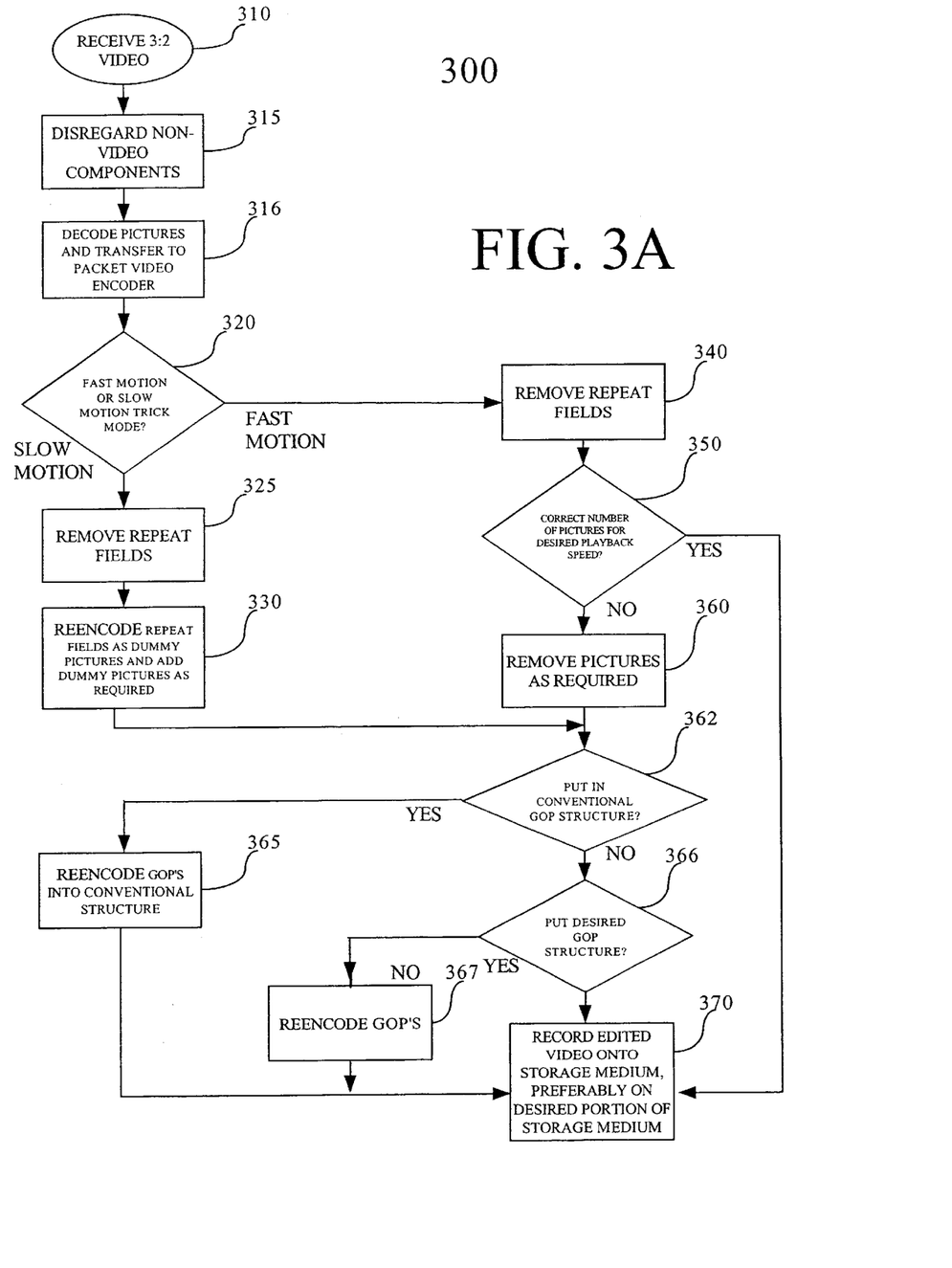
FIG. 3A is a flow chart that illustrates the operation of changing the playback speed of a video presentation recorded with repeat fields to produce fast motion or slow motion playback in accordance with the present invention.

Referring to FIG. 3A, a flowchart 300 illustrates how trick mode editing can be performed on video that contains repeat fields in accordance with the present invention. It should be understood that although the present invention is illustrated and particularly suited in utilizing repeat fields resulting from the 3:2 pulldown process, the present invention is not necessarily limited to such repeat structures. FIGS. 3B through 3G demonstrate how a single conventional GOP can be altered to produce a reduced playback speed and FIGS. 3H through 3M demonstrate how a single conventional GOP can be altered to produce an increased playback speed. However, it should be noted that the invention is not so limited, as any portion of video may be changed to playback at any speed slower or faster than normal playback.

Figure 3B:
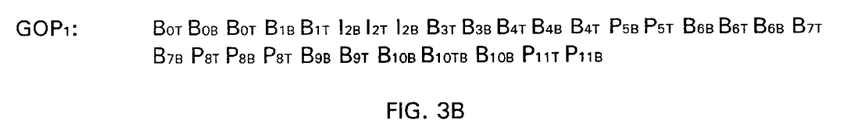
FIGS. 3B–3G demonstrate the editing process of FIG. 3A as applied to a conventional GOP for a video with 3:2 pulldown to produce one-half playback speed in accordance with the present invention.

Beginning al step 310 in FIG. 3A, the device 100 can begin to read data from the storage medium. In step 315, the demultiplexer 176 of FIG. 1 can separate the video component of the recorded video signal from the non-video components and can the discard the non-video components. Examples of non-video components include A_PCK's 40 and SP_PCK's 42. The NV_PCK's 38, however, can be left in the video signal being edited since, in accordance with DVD standards, each VOBU 36 is required to have an NV_PCK 38. Next, the pictures that make up the video signal can be decoded by the packet video decoder 178 and can then be transferred to the packet video encoder 144, as shown in step 316. FIG. 3B shows the form of a conventional GCP containing frames with repeat fields as it is presented to the packet video encoder 144. This GOP is shown in FIG. 3B with the subscript "T" representing the top field pictures and the subscript "B" representing the bottom field pictures. These field pictures are shown in normal font, as distinguished from frames which are shown in bold font.

Referring back to FIG. 3A, at decision block 320 a user can select slow motion or fast motion trick mode. If the user selects slow motion editing, repeat fields can be removed, as shown in step 325, and reencoded as dummy pictures, as shown is step 330. Further dummy pictures can be added as required to achieve the appropriate playback speed. A slower playback speed requires the insertion of a greater number of dummy pictures. In the case that the video is recorded with 3:2 pulldown, the repeat fields can be removed by setting the associated repeat first field flags to zero. The repeat first field flags are typically located in the picture headers for the field pictures.

A dummy picture is an MPEG picture that is merely a repeat of a particular I or non-I picture. Notably, however, the discrete cosine transform (DCT) coefficients and the motion vectors of a dummy picture are typically set to zero. Thus, dummy pictures require very little storage space on the storage medium. Typically, dummy pictures are already in a compressed format and, therefore, do not have to be reencoded prior to being recorded onto the storage medium; however, the invention is not limited in this regard.

In one arrangement, dummy pictures can be placed either before or after each picture in the video signal being altered; however, the invention is not so limited, as the dummy pictures can be inserted anywhere in the video signal. The number of dummy pictures inserted into the video signal depends on the selected slow motion speed. For example, a single dummy picture can be inserted either before or after each picture in the video signal, including each I picture, to produce a playback speed that is one-half of normal playback speed.

Although these dummy pictures can be inserted anywhere in the video being edited, in one arrangement, the dummy pictures can be strategically inserted to help control the motion artifact known as vibrating pictures. That is, the dummy pictures can be sequentially placed. For example, if the desired playback was one-third that of normal playback, then two dummy pictures can be inserted either before or after the picture being copied. Additionally, the original picture can be placed between the dummy pictures.

The process in which dummy pictures can be added and the GOP's reencoded for one-half speed slow motion playback for a non-progressive frame structure format is shown in FIGS. 3B through 3G. However, the present invention is not limited to this manner. The present invention may also be applied to other video formats.

Figure 3C:
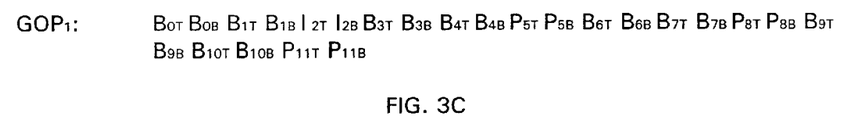
Figure 3D:
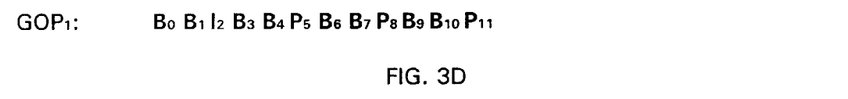
Figure 3E:
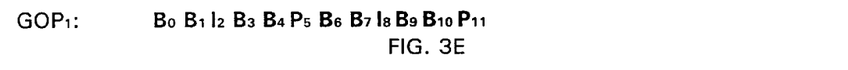
Figure 3F:
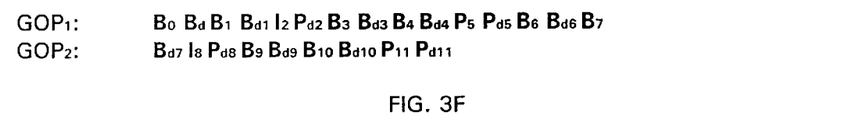
Figure 3G:
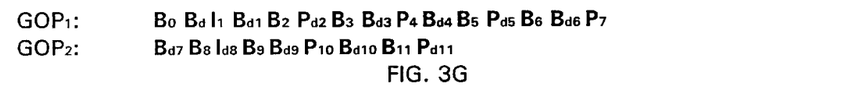

Referring to FIG. 3B, the display sequence of a GOP incorporating 3:2 pulldown is shown. FIG. 3C shows the display sequence of the same GOP with the repeat fields removed, resulting in the frame structure shown in FIG. 3D. As previously discussed, this is typically accomplished by setting the repeat first field flag to zero when the video is recorded with 3:2 pulldown. DVD standards limit the number of display fields that a GOP can contain to thirty-six, which equates to a maximum of eighteen frames per GOP. Although up to eighteen frames can be placed in either the original GOP or the newly created GOP's, an equal number of pictures are preferably placed in each GOP thereby enabling each GOP to undergo further processing, if desired, in order to conform to the conventional GOP structure. Further, a conventional GOP typically has one intra (I) frame, thus frames can be selected from a GOP being processed to be reencoded into additional I frames, as shown in FIG. 3E. After dummy pictures are added, additional GOP's can be created to compensate for the increased number of pictures in the portion of the video being edited, thereby keeping the GOP's below the maximum conventional size. An illustration of this is shown in FIG. 3F. FIG. 3G illustrates a GOP reencoded into a conventional structure.

Referring back to step 320 in FIG. 3A, a user can choose to perform fast motion editing. An appropriate number of pictures are removed in fast motion editing to achieve the appropriate playback speed. The overall number of pictures deleted from the video signal depends on the selected fast motion speed. For example, to produce a playback speed twice as fast as normal playback, one-half of the pictures contained in each GOP can be deleted from the video signal.

Since video encoded with 3:2 pulldown contains repeated field pictures, removing these pictures first, as shown in step 340, will result in smoother playback and improved trick mode performance. FIGS. 3H through 3M illustrate a process in which pictures can be removed for double speed fast motion playback for a non-progressive frame structure format. However, it should be noted that the invention is not so limited, as any portion of video may be changed to playback at any speed faster than normal playback. The present invention may also be applied to other video formats.

Figure 3H:
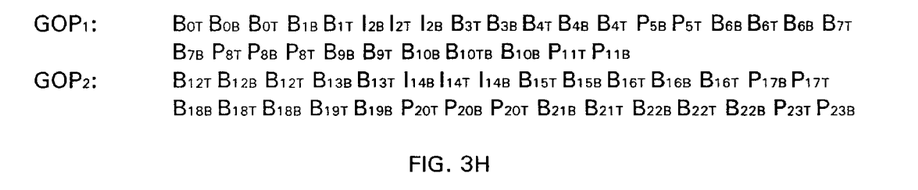
FIGS. 3H–3M demonstrate the editing process of FIG. 3A as applied to a conventional GOP For a video with 3:2 pulldown to produce double speed fast motion playback in accordance with the present invention.
Figure 3I:
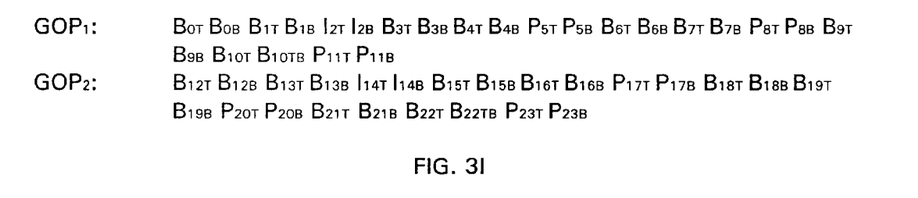
Figure 3J:
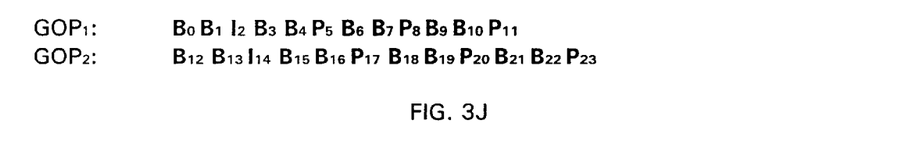

FIG. 3H illustrates two GOP's with a conventional GOP structure for video encoded with 3:2 pulldown. FIG. 3I illustrates the resulting GOP's after the repeat fields have been removed by setting the repeat field flags in the picture headers to zero, as shown in step 340 of FIG. 3A, creating the frame structure illustrated by the GOP's in FIG. 3J. Referring to decision block 350 of FIG. 3A, the video is checked to determine whether it contains the correct number of pictures for the desired playback speed. If the video does contain the correct number of pictures for the desired playback speed, then the edited video can be recorded onto a storage medium as shown in step 370.

Figure 3K:
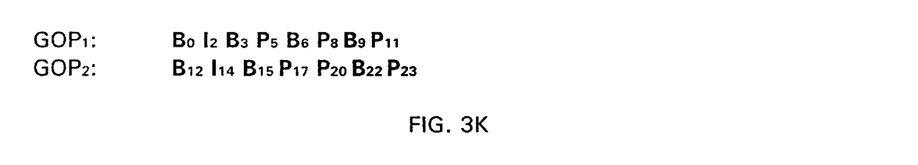

Nevertheless, if the edited video still contains too many pictures for the desired playback speed, then additional pictures can be removed in accordance with step 360. If the edited video will undergo a reencoding step to conform each edited GOP to a conventional GOP structure, then any of the frames can be removed. However, if the edited video will not undergo a reencoding step to conform each edited GOP to a conventional GOP structure, then it is preferable to remove B frames from the video signal. Referring to FIG. 3K, the B frames removed can be distributed throughout the GOP's rather than in lengthy groups containing successive B frames. Removing B frames in this fashion is preferable because it will produce a smoother playback and trick mode performance. As an example, in FIG. 3K, frames $B_1$, $B_4$, $B_7$ and $B_{10}$ in the first GOP can be removed and frames $B_0$, $B_3$, $B_6$, and $B_9$ can be retained. A similar GOP removal pattern is used for the second GOP. It should be noted, however, that the example shown in FIG. 3K is not intended to limit the invention to this particular deletion sequence, as any other suitable deletion sequence may be used.

Figure 3L:
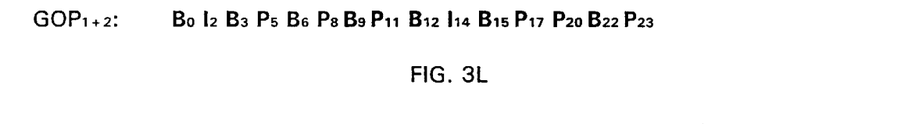
Figure 3M:
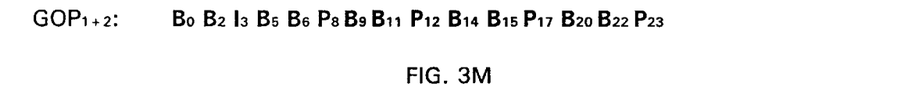

FIG. 3K illustrates example GOP's after sufficient pictures are removed for a double playback speed. Since these GOP's are smaller than conventional GOP's, they can be combined as appropriate to achieve an alternate number of pictures in the GOP structure. FIG. 3L illustrates a resulting GOP that is a combination of the GOP's from the previous figure. Per decision block 362, the GOP's can be put in conventional structure. FIG. 3M illustrates a GOP reencoded into a conventional structure per step 365. However, the invention is not thus limited. Alternatively, a user can choose to put the GOP's into another desired GOP structure, as shown in decision block 366. Per step 367, the GOP's can be reencoded into the desired GOP structure. Nevertheless, a user is not required to choose to reencode the GOP structure and can elect to leave the GOP's in the resulting GOP structure, an example of which is shown in FIG. 3K.

After the modified video is in the proper GOP structure, it can be recorded onto the storage medium, as shown in step 370. In accordance with the inventive arrangements, if the video has been read from a pre-recorded storage medium, the edited video can be placed in the same space that the original video previously occupied. This is because any dummy field pictures that have been placed in the video require very little storage space since they do not contain any encoded image information. Further, whatever storage space is required to fit these field pictures into the original space can be accommodated using the space on the storage medium that was previously used to store the deleted non-video information.

In one arrangement, however, if there is not enough room on the storage medium to fit the edited video in the desired recording location, then a certain number of pictures in the edited video can be decoded and then reencoded to reduce their picture resolution. Such a process can reduce the amount of storage space required for the pictures. In an alternative arrangement, the bit rate of the video signal can be lowered as the video is being placed onto the storage medium. Although lowering the bit rate can result in the loss of some of the video data and a corresponding reduction in picture resolution, such a process can reduce the amount of physical space required on the media to record the modified video sequence, and therefore permit the edited video signal to fit in the desired recording location.

Figure 4A:
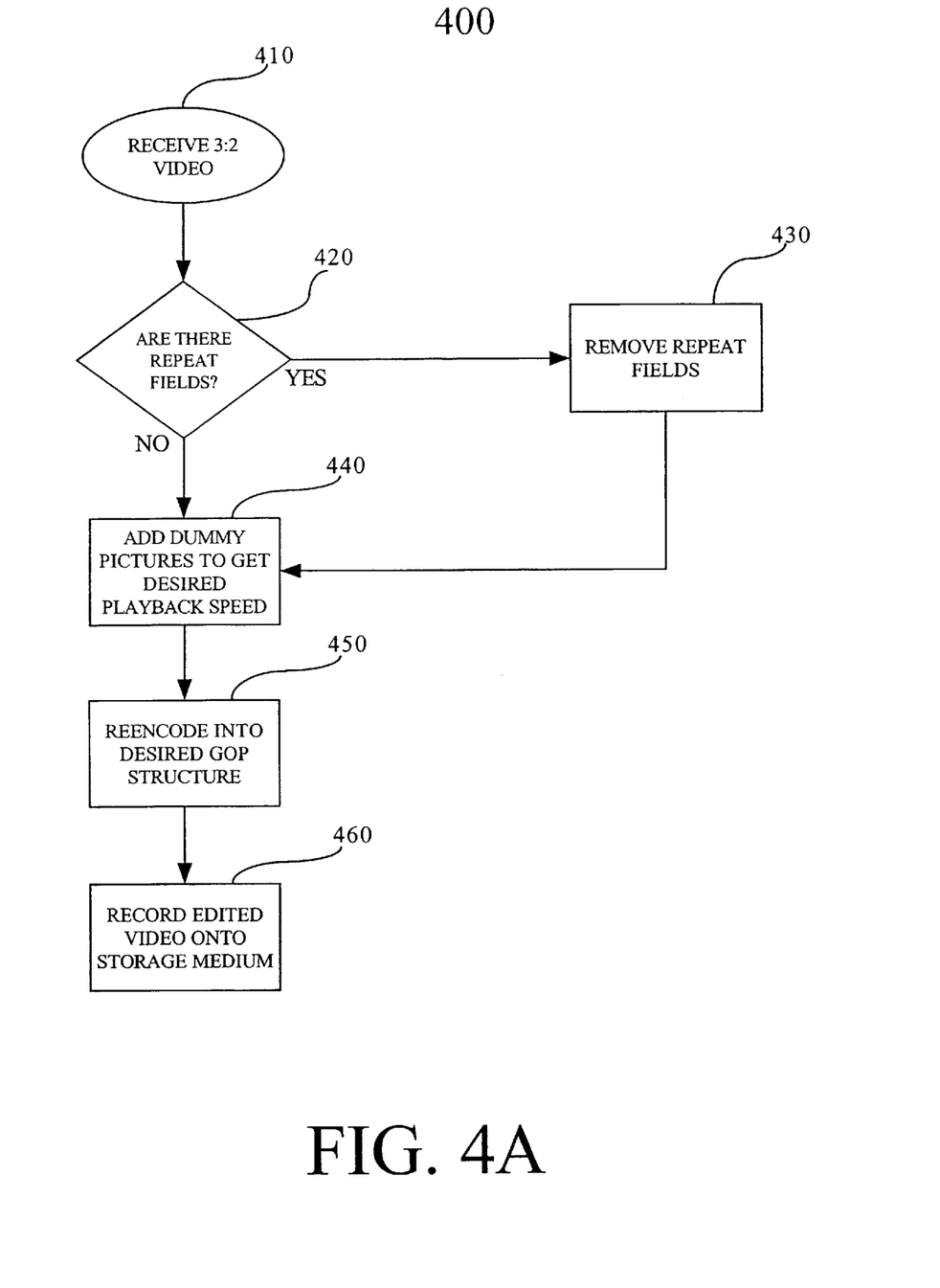
FIG. 4A is a flow chart that illustrates the operation of removing repeat fields from video recorded with 3:2 pulldown and replacing them with dummy pictures to achieve a desired display rate in accordance with the present invention.
Figure 4B:
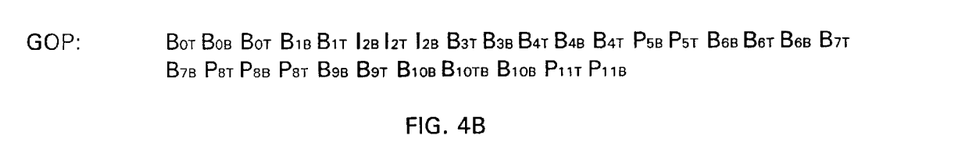
FIGS. 4B–4F demonstrate the editing process of FIG. 4A as applied to a conventional GOP for a video with 3:2 pulldown to remove repeat fields and replace them with dummy pictures in accordance with the present invention.

In another embodiment of the present invention, repeat fields can be removed from video and replaced with dummy pictures, as illustrated in FIGS. 4A through 4F. Beginning at step 410 in FIG. 4A, the device 100 can begin to read data from the storage medium. FIG. 4B illustrates a typical GOP structure containing repeat fields that can be contained in the video portion of the data.

Figure 4C:
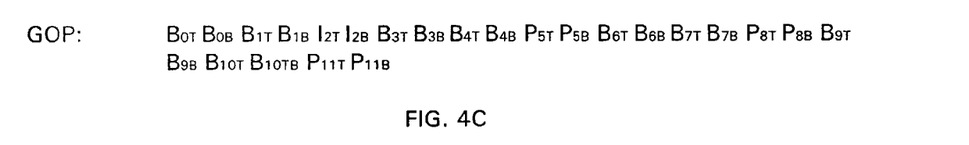
Figure 4D:
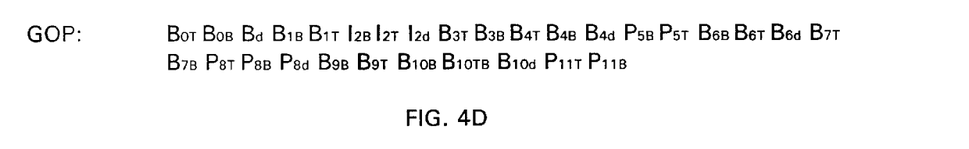
Figure 4E:
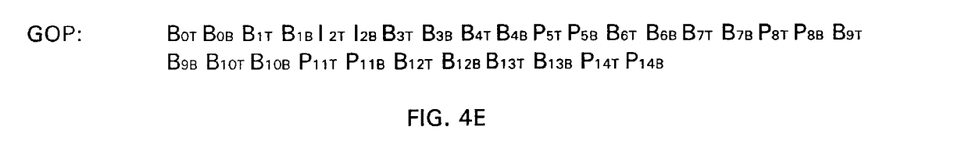
Figure 4F:
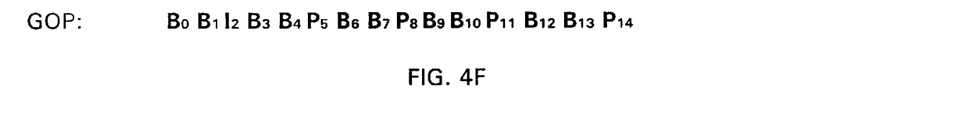

If repeat fields are present in the video, then those repeat fields can be removed by setting the repeat field flags in the picture headers to zero. This process is shown in decision block 420 and step 430. A typical resulting GOP structure is illustrated in FIG. 4C. Dummy pictures can then be added to the video in place of the repeat fields to get a desired playback speed or to maintain the original display rate, as shown in step 440. This result is shown in FIG. D. It should be noted, however, that the present invention is not limited in this manner and dummy pictures can also be added elsewhere in the GOP structure for slow motion effects. Referring back to step 420, if there are no repeat fields, then dummy pictures can be added as required to achieve a desired playback speed, as shown in step 440. The GOP can then be reencoded to combine field pairs into a desired GOP structure, as shown in step 450. This result is illustrated in FIG. 4E. FIG. 4F illustrates the equivalent frame structure for the GOP. The new GOP's can then be recorded onto the storage medium, as shown in step 460.

We claim:

1. In a rewritable storage medium, a method for changing a playback speed of a selected video segment having repeat fields comprising the steps of:

selecting the selected video segment, wherein the selected video segment has repeat fields; and, modifying said selected video segment by removing repeat fields to achieve fast motion play.

2. The method according to claim 1, wherein said removing repeat fields to achieve fast motion play comprises the step of setting a repeat first field flag located in a picture header to zero.

3. The method according to claim 1, further comprising the step of removing pictures from said selected video segment to achieve a desired playback speed.

4. The method according to claim 1, further comprising the step of reencoding said selected video segment into a desired GOP structure after modifying said selected video segment.

5. The method according to claim 1, further comprising the step of recording said modified video segment exclusively on a desired portion of a storage medium.

6. In a rewritable storage medium, a method for changing a playback speed of a selected video segment comprising the steps of:

selecting the selected video segment, wherein the selected video segment has repeat fields; and, encoding said repeat fields into conventional field pictures to change the playback speed of the video segment.

7. The method according to claim 6, further comprising the step of setting a repeat first field flag located in a picture header to zero.

8. The method according to claim 6, further comprising the step of adding dummy pictures to said selected video segment to achieve a desired playback speed.

9. The method according to claim 6, further comprising the step of reencoding said selected video segment into a desired GOP structure after modifying said selected video segment.

10. The method according to claim 6, further comprising the step of recording said modified video segment exclusively on a desired portion of a storage medium from which said video segment was read.

11. In a rewritable storage medium, a method for modifying a selected video segment having repeat fields comprising the steps of:

replacing said repeat fields with dummy pictures; and setting a repeat first field flag located in a picture header to zero.

12. The method according to claim 11, further comprising the step of adding dummy pictures to said selected video segment to achieve a desired playback speed.

13. The method according to claim 11, further comprising the step of reencoding said selected video segment into a desired GOP structure after modifying said selected video segment.

14. The method according to claim 11, further comprising the step of recording said modified video segment exclusively on a desired portion of a storage medium.

15. A system for changing the playback speed of a selected video segment having repeat fields, comprising:

storage medium reading circuitry for selectively reading a video segment which has been recorded on a first portion of a rewritable storage medium;

a video processor for modifying said selected video segment for a changed playback speed; and video recorder circuitry for recording said modified video segment exclusively on said first portion of said storage medium.

16. The system according to claim 15, wherein said video processor modifies said selected video segment by removing said repeat fields to achieve fast motion play.

17. The system according to claim 15, wherein said video processor modifies said selected video segment by encoding said repeat fields into conventional field pictures.

18. The system according to claim 15, wherein said video processor sets a repeat first field flag located in a video header to zero after modifying said selected video segment.

19. The system according to claim 15, wherein said video processor deletes a plurality of non-video packs in said selected video segment to reduce an amount of data contained in said modified video segment.

20. The system according to claim 15, wherein said video processor reduces a resolution of at least one frame contained in said modified video segment.

21. The system according to claim 15, wherein said video processor lowers a bit rate of said modified video segment during a recording step.

22. The system according to claim 15, wherein said video processor inserts into said selected video segment at least one dummy picture.

23. The system according to claim 15, wherein said video processor deletes from said selected video segment at least one picture.

24. In a rewritable storage medium, a method for changing a playback speed of a selected video segment comprising the steps of:

selecting the selected video segment, wherein the selected video segment has repeat fields;

encoding said repeat fields into conventional field pictures; and, setting a repeat first field flag located in a picture header to zero.

25. A system for changing the playback speed of a selected video segment having repeat fields, comprising:

storage medium reading circuitry for selectively reading a video segment which has been recorded on a portion of a rewritable storage medium;

a video processor for modifying said selected video segment for a changed playback speed; and, video recorder circuitry for recording said modified video segment exclusively on a portion of said storage medium;

wherein said video processor modifies said selected video segment by removing said repeat fields to achieve fast motion play.

26. A system for changing the playback speed of a selected video segment having repeat fields, comprising:

storage medium reading circuitry for selectively reading a video segment which has been recorded on a portion of a rewritable storage medium;

a video processor for modifying said selected video segment for a changed playback speed; and, video recorder circuitry for recording said modified video segment exclusively on a portion of said storage medium;

wherein said video processor sets a repeat first field flag located in a video header to zero after modifying said selected video segment.

27. In a rewritable storage medium, a method for changing a playback speed of a selected video segment comprising the steps of:

reading the selected video segment from a first storage location, wherein the selected video segment has repeat fields;

encoding said repeat fields into conventional field pictures to change the playback speed of the video segment; and, recording said modified video segment exclusively on a second storage location, said second storage location baying a physical space not larger than said first storage location.

* * * * *